United States Patent [19]
Meschke et al.

[11] 3,869,427
[45] Mar. 4, 1975

[54] TREATMENT OF LINEAR POLYESTER WITH ORGANIC MONOEPOXIDE

[75] Inventors: Robert Walter Meschke, Kinston; William Harrison Watson, Grifton, both of N.C.

[73] Assignee: E. I. du Pont de Nemours and Company, Wilmington, Del.

[22] Filed: Nov. 23, 1966

[21] Appl. No.: 596,429

Related U.S. Application Data

[63] Continuation-in-part of Ser. No. 533,454, March 11, 1966, abandoned.

[52] U.S. Cl............ 260/47 EP, 57/140 R, 152/330, 260/33.4 P, 260/47 C, 260/75 R, 260/75 EP, 260/75 T, 260/75 M
[51] Int. Cl............................................. C08g 17/14
[58] Field of Search........... 260/47 C, 75 EP, 47 EP

[56] References Cited
UNITED STATES PATENTS

| | | | |
|---|---|---|---|
| 2,863,855 | 10/1958 | Wilson et al. | 260/75 EP |
| 3,051,212 | 8/1962 | Daniels | 260/75 T X |
| 3,110,547 | 11/1963 | Emmert | 260/75 |
| 3,275,606 | 9/1966 | Kujawa et al. | 260/75 EP |
| 3,372,143 | 3/1968 | Terada et al. | 260/75 EP X |

FOREIGN PATENTS OR APPLICATIONS

| | | | |
|---|---|---|---|
| 1,091,747 | 10/1960 | Germany | 260/75 EP |
| 831,987 | 4/1960 | Great Britain | 260/75 EP |

*Primary Examiner*—Harold D. Anderson
*Attorney, Agent, or Firm*—Norris E. Ruckman

[57] ABSTRACT

An improvement in the process of preparing polyester filaments is disclosed as providing reinforced yarns and cords of polyester having low free-carboxyl-group contents which give superior performance in pneumatic tires and other reinforced rubber articles where heat-degradation is a problem. Reduction of free carboxyl groups is achieved by mixing with the molten polyester, prior to melt-spinning, 1,2-epoxy-3-phenoxypropane or 1,2-epoxy-3-n-hexyloxypropane.

8 Claims, No Drawings

TREATMENT OF LINEAR POLYESTER WITH ORGANIC MONOEPOXIDE

REFERENCE TO RELATED APPLICATION

This is a continuation-in-part of my copending application Ser. No. 533,454 filed Mar. 11, 1966, and now abandoned.

This invention relates to methods for making improved polyesters suitable for shaping into fibers for use in reinforced rubber articles. More particularly, this invention is concerned with the manufacture of polyester fibers having reduced concentrations of free carboxyl groups.

Synthetic linear condensation polyesters suitable for use as textile fibers, and methods for their preparation, are described by Whinfield and Dickson in U.S. Pat. No. 2,465,319 dated Mar. 22, 1949. The best known example of these polyesters, polyethylene terephthalate, is now widely used in the preparation of wearing apparel and is becoming increasingly important as a reinforcing element in reinforced elastomeric structures such as pneumatic tires and V-belts. For tires which are subjected to heavy loads at high speeds, best results are obtained if the reinforcing polyester fiber is characterized by a reduced concentration of free carboxyl groups, as taught by Daniels in U.S. Pat. No. 3,051,212 dated Aug. 28, 1962. The present invention is concerned with a method of reducing the concentration of carboxyl groups in a commercial polyesterification process.

The present invention provides a superior method of capping free carboxyl groups of high molecular weight polyesters suitable for conversion to high strength fibers. The capping agents employed react quickly, smoothly and efficiently with the carboxyl groups of molten polyesters without significant reduction in the molecular weight of the polymer, and with no significant loss in any other desirable property of the polymer. The method is splendidly adaptable to an integrated continuous process in which the polymer is continuously manufactured and spun directly into fibers without intermediate solidification and remelting steps.

In accordance with the present invention, a process is provided in which the concentration of free carboxyl groups in a fiber-forming linear terephthalate polyester is reduced smoothly and efficiently by mixing with the molten polyester, after completion of the polymerization, a liquid, high boiling, organic monoepoxide represented by the formula

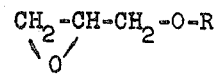

where R is a monovalent phenyl or n-hexyl radical.

Although the process may be carried out at atmospheric pressure, it is preferred that the monoepoxide be added to and mixed with the molten polyester under superatmospheric pressure. The monoepoxide should be allowed to react with the molten polyester for a period of at least 1 minute, and preferable 5–20 minutes, before cooling or melt spinning into filaments. The polymer may be kept in the molten state for periods longer than 20 minutes if desired, but usually times greater than about 45 minutes will be avoided to prevent unnecessary heat degradation of the polymer.

It will be apparent that the reduction in carboxyl group concentration in the polyester will be dependent upon the amount of epoxy compound added. Some reduction in carboxyl content will be obtained with as little as 0.1 mol of the epoxy compound per equivalent of carboxyl groups present in the polymer but, for best results it is preferred that the amount of the epoxy compound added be from 0.5 to 5 mols per equivalent of carboxyl groups present in the unmodified polymer. Preferably the amount of epoxy compound added will be less than about 3 mol per cent based on polyester, since greater amounts may form ether links in the polymer to an extent which is detrimental to the strength retention of yarn or cord, prepared from the polymer, when used under high temperature hydrolytic conditions.

The advantageous results obtained by the present invention are in sharp contrast to the results obtained with other well-known epoxy compounds used in the same manner. For example, styrene oxide added to molten polyethylene terephthalate appears to increase the level of carboxyl groups rather than decrease it. The same is true of dipentene dioxide. Ethylene oxide reduces the carboxyl content slightly but is found to be very inefficient when used in commercial processes. Diepoxides such as the diglycidyl ether of 2,2-bis(4-hydroxyphenyl)propane produce cross-linked polyesters which are unsuitable for the formation of fibers.

In a preferred embodiment of the process, polyethylene terephthalate fibers are prepared continuously as follows: Dimethyl terephthalate and ethylene glycol are fed continuously to an ester interchange column along with a suitable catalyst. By-product methanol is removed as vapor, and bis-2-hydroxyethylterephthalate is drawn off continuously in liquid form. The liquid monomer is then passed through zones of higher temperature and lower pressure where additional glycol is removed and prepolymer is formed. The prepolymer then passes through a final polymerization vessel operating at a temperature of 275°–285°C. and a pressure of 0.5–1.5 mm. of mercury where the molecular weight of the polymer is raised to the desired level. The high molecular weight polymer is removed from this polymerization vessel by means of a screw-pump and transferred directly, under pressure, through heated conduits to a spinning machine where fibers are spun. In accordance with this embodiment of the invention, a liquid, highboiling monoepoxide is injected into the molten polyester in the screw-pump where it is mixed with the polyester and where the reaction with the free carboxyl groups is begun. The reaction between the epoxide and the free carboxyl groups continues as the polymer moves, under pressure, through the heated conduits to the spinning machine, which may take from 10–20 minutes.

The process of the present invention is particularly valuable in the preparation of low-carboxyl-content polyesters of very high molecular weight, i.e., those having a relative viscosity above about 45. Other methods of reducing the carboxyl content of very high molecular weight polyesters have been found unsatisfactory.

The term "free carboxyl groups" is used to include both the un-ionized acid group, —COOH, and the ionized group, —COO⁻. The determination of the concentration of free carboxyl groups is made in accordance with the procedure described by Pole in *Analytical*

Chemistry, Vol. 26, pg. 1614, October 1954, and is reported as the carboxyl content of the polymer in equivalents per million grams.

The term "relative viscosity" refers to the ratio of the viscosity of a 10% solution of polyethylene terephthalate in a mixture of 10 parts of phenol and 7 parts of 2,4,6-trichlorophenol (by weight) to the viscosity of the phenol trichlorophenol mixture, per se, measured in the same units at 25°C.

The term "intrinsic viscosity" is usually defined as the limit of the fraction $$[\ln (r)]/c$$

as $c$ approaches O, where $r$ is the relative viscosity as defined above except that the relative viscosity is measured at several different concentrations in order to extrapolate to zero concentration.

The following examples further illustrate the present invention:

EXAMPLE I

Bis-2-hydroxyethyl terephthalate is prepared continuously from ethylene glycol and dimethyl terephthalate by the method of Vodonik, U.S. Pat. No. 2,829,153 dated Apr. 1, 1958, with manganese acetate and antimony oxide added as catalysts. The monomeric product is supplied continuously to a polymerization system where the temperature is raised and the pressure reduced to produce high molecular weight polyethylene terephthalate. In the early stages of polymerization, a glycol dispersion of titanium dioxide is added to the polymerization mixture to give a concentration of 0.1% $TiO_2$ in the final polymer. The final stages of polymerization are carried out at a temperature of about 280°C. and a pressure of about 1 mm. of mercury using the finishing apparatus of Willey, U.S. Pat. No. 3,046,099 dated July 24, 1962, and the post-finishing apparatus of Kilpatrick, U.S. Pat. No. 3,248,180 dated Apr. 26, 1966, with a total residence time in the post finisher of about 2 hours. The polymer is removed from the outlet end of the post-finisher by means of a screw-pump similar to that described by Bendett in U.S. Pat. No. 2,805,627 dated Sept. 10, 1957, which raises the pressure in the polymer to about 2000 psig and forces it through heated conduits directly to the spinning machine. Liquid 1,2-epoxy-3-phenoxypropane is introduced continuously, in measured quantities, into the molten polymer at the upstream end of the screw-pump, where the pressure is about 300 psig, so that it becomes thoroughly mixed with the polymer by the action of the pump, and is maintained in contact with the polymer as it moves through the heated conduits, which requires about 15 minutes. The epoxy-treated molten polymer transferred to the spinning machine is extruded through a 192-hole spinneret into a heated inert gas to produce filaments which are then quenched in cold air and drawn to an 1,100-denier yarn. The yarn properties obtained for different concentrations of epoxy compound are shown in the following table. All samples were found to have a relative viscosity of approximately 50.

Table 1

| Sample No. | Epoxy Concen. (wt. %) | Carboxyl Content (equiv./ million gm.) | Tenacity (gpd) | Elongation (%) |
|---|---|---|---|---|
| 1 | 0 | 28 | 8.84 | 14.2 |
| 2 | 0.5 | 11.8 | 8.68 | 13.9 |
| 3 | 1.0 | 6.3 | 8.59 | 14.0 |
| 4 | 2.0 | 2.9 | 7.54 | 16.8 |

The data in the table clearly show the reduction in concentration of free carboxyl groups obtained by the process of the present invention.

Similar results are obtained when the procedure of Example I is repeated using 1,2-epoxy-3-n-hexyloxypropane as the epoxy treating agent.

In a preferred embodiment of the invention where manganous acetate is used as a catalyst for the ester interchange reaction and phosphoric acid is added to the system to improve the color of the final polymer, in accordance with the teaching of Engle and Pohl in U.S. Pat. No. 3,028,366 dated Apr. 3, 1962, it is preferred that the molar ratio of phosphoric acid to manganous acetate be maintained above about 0.9. Ratios below 0.9 result in increased polymer color, while ratios above 0.9 result in efficient reaction of epoxide with carboxyl groups and consequent improved hydrolytic stability of the polymer. Ratios in the range 0.9 to 2.0 are preferred, although ratios as high as 2.5 may be used if desired. Ratios higher than about 2.5 appear to reduce hydrolytic stability.

EXAMPLE II

A 500 ml. 3-neck flask is charged with 0.65 mol dimethyl terephthalate and 1.365 mols ethylene glycol, along with a catalytic quantity of manganous acetate and antimony oxide. The mixture is heated at atmospheric pressure until the ester interchange reaction is completed and by-product methanol removed. Then the pressure in the flask is reduced and the temperature raised and polymerization allowed to proceed until the desired melt viscosity is obtained. Pressure in the flask is then brought to atmospheric pressure with dried nitrogen and a sample of the polymer melt is removed for testing. At this point, 2 ml. of 1,2-epoxy-3-phenoxypropane are added below the surface of the polymer melt remaining in the flask, with stirring, and the temperature is maintained at 290°C. Stirring is continued for 5 minutes, and then a sample of the epoxide-treated polymer is collected. Analysis for carboxyl content (equivalents per $10^6$ grams polymer) and intrinsic viscosity of the polymer gives the values in the following table:

Table 2

| Polymer | Carboxyl Content | Intrinsic Viscosity |
|---|---|---|
| Unmodified | 23.2 | 0.57 |
| Epoxide treated | 6.2 | 0.56 |

These data show the marked reduction in concentration of free carboxyl groups obtained by the process of this invention without significant change in polymer molecular weight.

EXAMPLE III

The general procedure of Example II is repeated using only 1.5 ml. of 1,2-epoxy-3-phenoxypropane. Analysis of the polymer before and after addition of the epoxy compound gives the results in the following table:

Table 3

| Polymer | Carboxyl Content | Intrinsic Viscosity |
|---|---|---|
| Unmodified | 21.0 | 0.67 |
| Epoxide treated | 8.9 | 0.64 |

EXAMPLE IV

In this comparative example, an epoxy compound falling outside the scope of the present invention is used in the same manner as the preceeding two examples.

Following the general procedure of Example II, polyethylene terephthalate is prepared and then treated with 1.5 ml. of styrene oxide and stirred for 5 minutes at 295°C. Polymer samples taken before and after addition of the styrene oxide are analyzed for carboxyl content and intrinsic viscosity with the results shown in the following table:

Table 4

| Polymer | Carboxyl Content | Intrinsic Viscosity |
|---|---|---|
| Unmodified | 28.5 | 0.76 |
| Epoxide treated | 37.1 | 0.59 |

The data in the table show that styrene oxide causes an increase in the carboxyl content of polyethylene terephthalate, in contrast to the decrease obtained by the process of the present invention.

A similar increase in carboxyl content is found when the experiment is repeated with 1,2-epoxy-3-isopropoxypropane.

Although the invention has been illustrated with specific reference to polyethylene terephthalate, it is apparent that the inventive concept extends to other linear fiber-forming polyesters, and particularly to the linear terephthalate polyesters. By linear terephthalate polyester is meant a linear condensation polyester comprising recurring glycol dicarboxylate structural units in which at least about 85% of the recurring structural units are units of the formula:

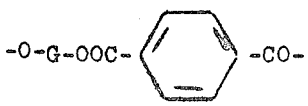

wherein —G— represents a divalent organic radical containing from about 2 to about 18 carbon atoms which is attached to the adjacent oxygen atoms by saturated carbon atoms. Preferably, the radical —G— contains from 2-10 carbon atoms. The terephthalate radical may be the sole dicarboxylate constituent of the recurring structural units, or up to about 15% of the structural units may contain other dicarboxylate radicals such as adipate, sebacate, isophthalate, bibenzoate, hexahydroterephthalate, and like radicals.

The polymer treated in accordance with the process of this invention, and containing a reduced concentration of carboxyl groups, is most useful in the form of yarns and cords for reinforcing elastomeric articles. The advantages appear most prominently in pneumatic tires and V-belts, but the yarns and cords are also useful in reinforcing flat belts, tarpaulins and other rubber covered fabrics, hydraulic hose for use in automobiles and other vehicles, reinforced rubber bellows in airspring suspension systems for automotive vehicles, steam hose, and the like.

Since many different embodiments of the invention may be made without departing from the spirit and scope thereof, it is to be understood that the invention is not limited by the specific illustrations except to the extent defined in the following claims.

I claim:

1. In the preparation of synthetic linear terephthalate condensation polyester in which at least about 85% of the recurring structural units are units of the formula:

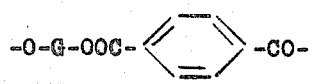

wherein —G— represents a divalent organic radical containing from about 2 to about 18 carbon atoms which is attached to the adjacent oxygen atoms by saturated carbon atoms, the improvement which comprises reducing the content of free carboxyl groups in the polyester by mixing the polyester in molten form for 1 minute to about 45 minutes with a liquid organic monoepoxide represented by the formula:

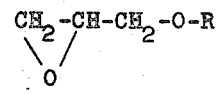

where R is a monovalent phenyl or n-hexyl radical, the organic monoepoxide being added to the polyester after polymerization of the polyester to an intrinsic viscosity of at least 0.56, when determined for solutions of the polyester in phenol/trichlorophenol at 25°C., and being added in an amount providing less than 3 mol per cent based on the polyester and at least 0.1 mol per equivalent of free carboxyl groups present in the polyester prior to addition of the monoepoxide.

2. A process as defined in claim 1 wherein the monoepoxide is 1,2-epoxy-3-phenoxypropane.

3. A process as defined in claim 1 wherein the monoepoxide is 1,2-epoxy-3-n-hexyloxypropane.

4. A process as defined in claim 1 wherein the monoepoxide is added to and mixed with the molten polyester under superatmospheric pressure.

5. A process as defined in claim 1 wherein said polyester after polymerization has a relative viscosity of at least 45, determined as a 10% solution at 25°C. in a mixture of 10 parts phenol and 7 parts 2,4,6-trichlorophenol by weight.

6. A process as defined in claim 5 wherein the polyester is prepared by ester interchange reaction in the presence of manganous acetate catalyst followed by melt polymerization in the presence of phosphoric acid to at least 45 relative viscosity before adding the monoepoxide to the molten polyester, the molar ratio of phosphoric acid to manganous acetate being within the range of 0.9–2.0 to 1.

7. A process for reducing the concentration of free carboxyl groups in a synthetic linear fiber-forming polyethylene terephthalate comprising reacting said polyethylene terephthalate in molten form with 1,2-epoxy-3-phenoxy-propane in an amount providing less than 3 mol per cent based on the polyethylene terephthalate and at least 0.1 mol per equivalent of free carboxyl groups present in the polyethylene terephthalate prior to addition of the 1,2-epoxy 3-phenoxy propane for 1 minute to about 45 minutes.

8. A process for reducing the concentration of free carboxyl groups in a synthetic linear fiber forming polyethylene terephthalate comprising reacting said polyethylene terephthalate in molten form with 1,2-epoxy-3-phenoxy propane in an amount between 0.5 and 2.0 weight percent based on the polyethylene terephthalate.

* * * * *